(12) United States Patent
Kim et al.

(10) Patent No.: US 8,375,075 B2
(45) Date of Patent: Feb. 12, 2013

(54) HIGH-SPEED DISCRETE FOURIER TRANSFORM APPARATUS AND METHOD THEREOF

(75) Inventors: Hyung Jin Kim, Gyeryong-si (KR); Seong Chul Cho, Daejeon (KR); Dae Ho Kim, Daejeon (KR); Yeong Jin Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 703 days.

(21) Appl. No.: 12/570,357

(22) Filed: Sep. 30, 2009

(65) Prior Publication Data

US 2010/0161699 A1    Jun. 24, 2010

(30) Foreign Application Priority Data

Dec. 19, 2008 (KR) .................. 10-2008-0130213

(51) Int. Cl.
G06F 17/14 (2006.01)
(52) U.S. Cl. ........ 708/405; 708/403; 708/404; 708/406; 708/409; 708/408; 375/149; 375/340
(58) Field of Classification Search ........... 708/403–409
See application file for complete search history.

(56) References Cited

U.S. PATENT DOCUMENTS 6,337,910 B1 * 1/2002 Goff et al. ...................... 380/28
7,028,064 B2 * 4/2006 Buchert et al. ................ 708/405
7,539,238 B2 * 5/2009 Pan et al. ...................... 375/149
7,843,970 B2 * 11/2010 Yang ............................. 370/498
7,881,247 B2 * 2/2011 Pan et al. ...................... 370/319
8,015,226 B2 * 9/2011 Azadet et al. ................. 708/405
8,064,546 B2 * 11/2011 Jiang et al. ................... 375/340
2009/0313314 A1 * 12/2009 Mundarath et al. ........... 708/405

FOREIGN PATENT DOCUMENTS

KR   1020070077022    7/2007
WO   WO 2006/118411  * 11/2006

OTHER PUBLICATIONS

"Single Carrier FDMA for Uplink Wireless Transmission," IEEE Vehicular Technology Magazine, vol. 1(3):30-38 (2006).*

* cited by examiner

Primary Examiner — Tammara Peyton
(74) Attorney, Agent, or Firm — Nelson Mullins Riley & Scarborough LLP; EuiHoon Lee, Esq.

(57) ABSTRACT

Provided are a high-speed Discrete Fourier Transform (DFT) apparatus and a method thereof. The high-speed DFT apparatus includes a zero padding unit, a Fast Fourier Transform (FFT) unit, and a preamble index decision unit. The zero padding unit receives a first input signal having a length of a prime number and changes the first input signal into a second input signal having a length of an exponentiation of 2. The FFT unit performs a FFT on the second input signal outputted from the zero padding unit. The preamble index decision unit detects a preamble index from an output signal from the FFT unit.

6 Claims, 6 Drawing Sheets

HIGH-SPEED DISCRETE FOURIER TRANSFORM APPARATUS AND METHOD THEREOF

CROSS-REFERENCE TO RELATED APPLICATIONS

This application claims priority under 35 U.S.C. §119 to Korean Patent Application No. 10-2008-0130213, filed on Dec. 19, 2008, in the Korean Intellectual Property Office, the disclosure of which is incorporated herein by reference in its entirety.

TECHNICAL FIELD

The present disclosure relates to a wireless communication system, and in particular, to a high-speed Discrete Fourier Transform (DFT) apparatus and method for detecting a random access signal in a Single-Carrier Frequency Division Multiple Access (SC-FDMA) system.

BACKGROUND

Discrete Fourier Transform (DFT) is applied to various fields such as mathematics. A DFT formula may be expressed as the following Equation 1:

$$X_k = \sum_{n=0}^{N-1} x_n e^{-\frac{2\pi i}{N}nk} \qquad \text{Equation 1}$$

where k=0, . . . , N−1

A DFT operation is widely used in the communication field. For example, FIG. 1 shows a result obtained by performing a DFT in a communication system.

FIG. 1 is a graph illustrating a result of a DFT having a length of 839 in a prior-art 3GPP-LTE system. That is, FIG. 1 shows an output of 839-DFT when a preamble index is 1. The index having the highest output value is 77.

A DFT of length 839 is performed to allow a base station to detect a Physical Random Access Channel (PRACH) of terminal in a 3GPP-LTE system. In the result of the DFT as described in FIG. 1, there is a peak value at an arbitrary point, which is used for detection of a PRACH signal. However, limitations in hardware size and speed are involved in an implementation of a DFT of length 839 in hardware.

On the other hand, a Fast Fourier Transform (FFT) obtains the same result as a DFT. A difference between a FFT and a DFT is that a FFT is faster than a DFT.

A complex multiplication and a complex addition are considered to examine how efficient FFT is.

$N^2$ complex multiplications and $N^2$ complex additions are required to calculate a DFT. In a well-known Radix-2 Cooley-Tukey FFT algorithm, $(N/2)\log_2 N$ complex multiplications and $(N)\log_2 N$ complex additions are required.

For example, if N is 64, 4096 complex multiplications and 4096 complex additions are necessary to calculate a DFT. If the Radix-2 Cooley-Tukey FFT algorithm is used to obtain the same result, 192 complex multiplications and 384 complex additions are necessary. Accordingly, compared to a DFT operation, the number of the complex multiplications in a FFT operation is reduced to $\frac{1}{21}$ of that in the DFT operation, and the number of the complex additions is reduced to $\frac{1}{11}$ of that in the DFT operation.

Upon system implementation, a FFT algorithm reduces time taken to calculate a DFT and the amount of hardware necessary for the calculation.

However, there is a limitation in that FFT can be implemented only when N is an exponentiation of 2.

Since hardware size and speed are the limitations in implementing DFT in hardware, a FFT algorithm is used to reduce calculation time and the amount of hardware. However, the FFT algorithm can be implemented only when N is an exponentiation of 2. Accordingly, the FFT cannot be applied to a high-speed processing of a DFT having a length of a prime number, which is performed to detect a random access signal in a SC-FDMA system.

FIG. 2 is a diagram illustrating a configuration of a prior-art apparatus performing a DFT on an input signal having a prime length in order to detect a random access signal. FIG. 3 is a diagram illustrating a result of a DFT on an input signal having a prime length in the apparatus described in FIG. 2.

Referring to FIG. 2, an apparatus for performing a DFT on an input signal having a prime length to detect a random access signal includes an M-DFT unit 11 and a preamble index decision unit 12.

If an input signal of length M is inputted into the apparatus, the M-DFT unit 11 performs an operation of Equation 1, and outputs a signal of length M (where M is a prime number).

The output signal of the M-DFT is illustrated in FIG. 3. That is, the output signal of the M-DFT has the highest values at 0, CS, 2*CS . . . according to a preamble index, respectively. Here, CS represents a cyclic shift size of a preamble sequence determined by the preamble index. That is, the preamble sequences corresponding to the preamble index are cyclic-shifted by CS, respectively.

The highest values of the preamble sequences are moved to the left according to a transmission delay of a transmitter and a channel delay of a radio channel.

Accordingly, a PRACH receiver detects the highest value between (V_MAX*CS) and (M−1) using a preamble index having the highest value at 0, the highest value between 1 and (CS−1) using a preamble index having the highest value at CS, and so on.

In a related-art, in order to detect a random access signal from an input signal having a prime length, a PRACH signal is processed using an M-DFT as described above. In this case, the calculation amount of the M-DFT unit 11 increases to cause a system delay. Moreover, the configuration of the system becomes complicated.

SUMMARY

In one general aspect, a high-speed Discrete Fourier Transform (DFT) apparatus includes: a zero padding unit receiving a first input signal having a prime length and changing the first input signal into a second input signal having a length of an exponentiation of 2 to output; a Fast Fourier Transform (FFT) unit performing a FFT on the second input signal outputted from the zero padding unit; and a preamble index decision unit detecting a preamble index from an output signal outputted from the FFT unit.

In another general aspect, a high-speed DFT method includes: transforming a first input signal having a prime length into a second input signal having an exponentiation of 2; performing a FFT on the second input signal; and detecting a preamble index from an output signal outputted through the FFT.

Other features and aspects will be apparent from the following detailed description, the drawings, and the claims.

DETAILED DESCRIPTION OF EMBODIMENTS

Figure 1:
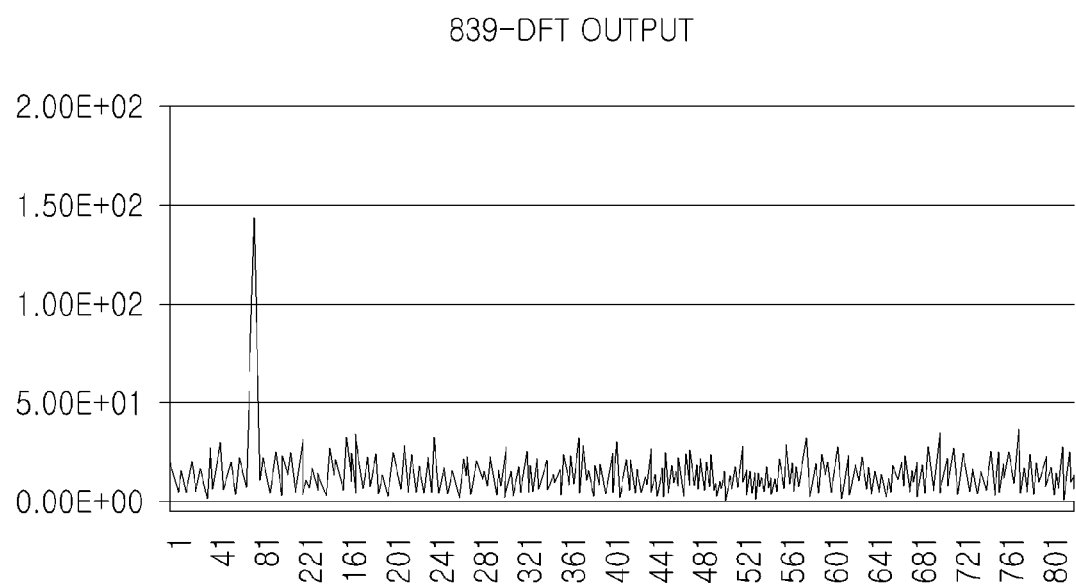
FIG. 1 is a graph illustrating a result of performing a Discrete Fourier Transform (DFT) having a length of 839 in a related-art 3GPP-LTE system.

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 4:
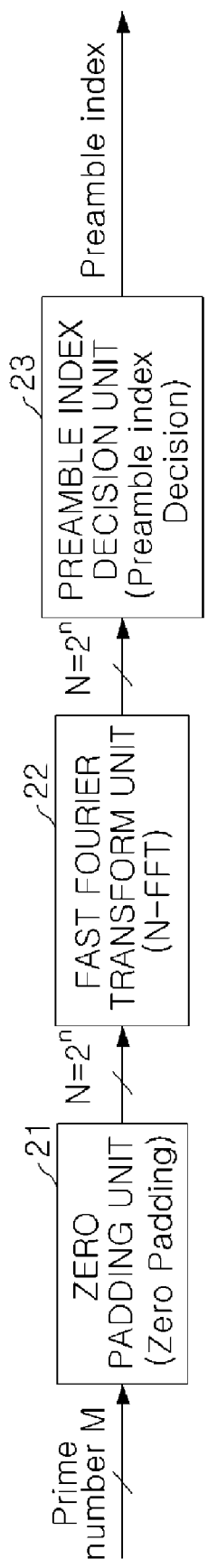
FIG. 4 is a block diagram illustrating a high-speed DFT apparatus according to an embodiment.

FIG. 4 is a block diagram illustrating a high-speed Discrete Fourier Transform (DFT) apparatus according to an embodiment of the present invention. The high-speed DFT apparatus performs a Fast Fourier Transform (FFT) to detect a random access signal from an input signal having a prime length.

Figure 5:
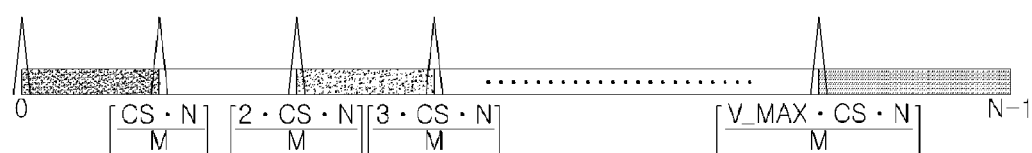
FIG. 5 is a diagram illustrating a result of performing a Fast Fourier Transform (FFT) on an input signal having a prime length in an apparatus described in FIG. 4.

FIG. 5 is a diagram illustrating a result of a Fast Fourier Transform (FFT) on an input signal having a prime length in an apparatus described in FIG. 4. Mores specifically, FIG. 5 shows a result of a FFT in a FFT unit 22.

In a modulator of a Single-Carrier Frequency Division Multiple Access (SC-FDMA) scheme in a communication modem of a related-art 3GPP LTE mobile communication system, the modulator receives bit-stream data to transform into a symbol according to a modulation type of the modulator, and transforms the symbol into a signal of a frequency domain by performing a DFT on the symbol. However, the apparatus according to this embodiment is applied to an apparatus for detecting a random access signal when a terminal that is turned on tries to communicate with a base station for the first time in the above mobile communication system. In particular, a high-speed DFT on an input signal having a prime length is performed using a FFT.

That is, while only a DFT is performed to detect a random access signal from an input signal having a prime length in a related-art, a FFT is substituted for a DFT in this embodiment.

Thus, a high-speed DFT apparatus according to an embodiment includes an N-FFT unit 22 as described in FIG. 4.

Figure 2:
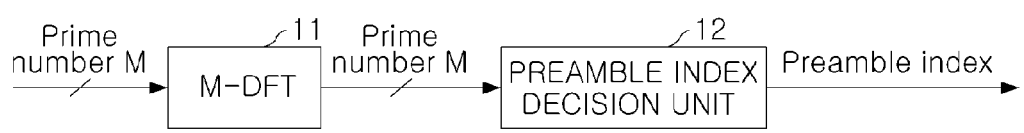
FIG. 2 is a diagram illustrating a configuration of a related-art apparatus performing a DFT on an input signal having a prime length.

FIG. 4 shows a modified apparatus according to an embodiment from an apparatus in FIG. 2. The high-speed DFT apparatus includes a zero padding unit 21, an N-FFT unit 22, and a preamble index decision unit 23.

First, a first input signal having a length of M (M is a prime number) is changed into a second input signal having a length of an exponentiation of 2 ($N=2^n$), which is implemented by adding zeros to the end of the first input signal through the zero padding unit 21.

Here, a prime number (or a prime) refers to a positive natural number having only two distinct natural number divisors: 1 and itself. For example, the prime numbers are 2, 3, 5, 7, 11, 13, 17, 19, 23, 29, 31, 37 . . . . Changing the first input signal of having a length M (where M is a prime number) into the second input signal having a length of an exponentiation of 2 ($N=2^n$) by adding 0 to the end of the first input signal means that index values assigned from M to N are set to 0 for the second input signal of length N, which is a number corresponding to the exponentiation of 2 that is generated after the prime number M.

For example, when a first input signal of length 839 (M) is inputted into the zero padding unit 21, the zero padding unit 21 extracts an exponentiation of 2 after 839. In this case, 1024, 2048, 4096 and the like may be selected as an exponentiation of 2. If a second input signal of length 1024 (N) is selected, the zero padding unit 21 additionally assigns indices from 840 to 1024 for the first input signal of length 839, and assigns 0 to index values from 840 to 1024. In the first input signal of length 839 as described in FIG. 1, various values are set to all index values from 1 to 839. The zero padding unit 21 assigns 0 to the additional index values from 840 to 1024. Accordingly, there is no difference in the status of the first input signal and the second input signal.

The second input signal having the length N of the exponentiation of 2 outputted from the zero padding unit 21 is inputted into N-FFT 22 to undergo a FFT. Then, N-FFT 22 outputs an output signal of length N.

Figure 3:
FIG. 3 is a diagram illustrating a result of performing a DFT on an input signal having a prime length in an apparatus described in FIG. 2.

Here, the output signal of the N-FFT 22 is illustrated in FIG. 5. Locations CS, 2*CS . . . of the highest values, which are present as an output of the 839-DFT in FIG. 3 that shows a result according to a related-art technology, are present in an upper bound form of N/M times as shown in FIG. 5.

Since N>M, it will be understood that CS<(CSN/M). Accordingly, resolution is increased.

Table 1 shows a comparison between the 839-DFT and 1024-FFT in the number of complex multiplications and the number of complex additions. The number of the complex multiplications is decreased by about 0.73%, and the number of the complex additions is decreased by about 1.45%.

TABLE 1

|  | Complex Multiplication | Complex Addition |
|---|---|---|
| 839-DFT | $N^2 = 703921$ | $N^2 = 703921$ |
| 1024-FFT | $(N/2)\log_2 N = 5120$ | $N\log_2 N$ |
| 1024-FFT/839-DFT (%) | 0.73 | 1.45 |

Meanwhile, the preamble index decision unit 23 detects a preamble index from the signal outputted from the N-FFT 22.

Figure 6:
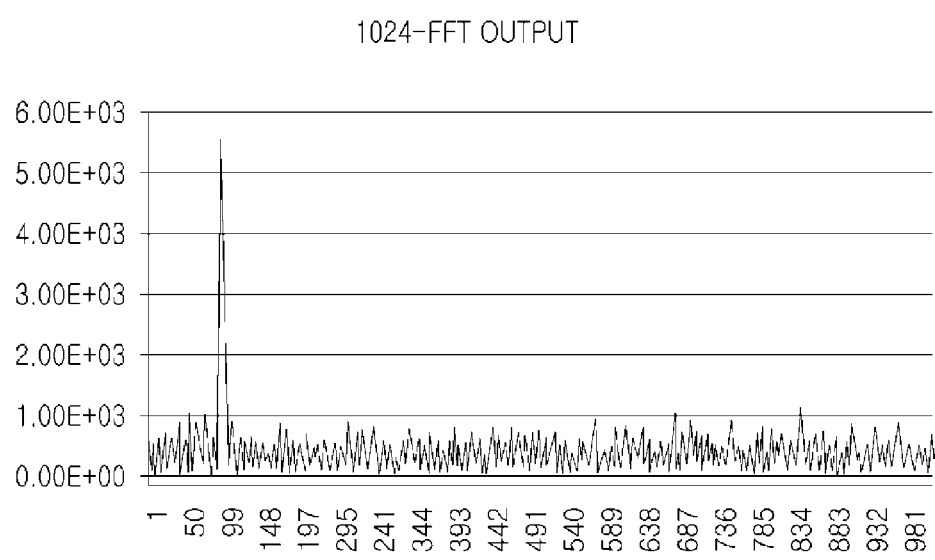
FIG. 6 is a graph illustrating a result of performing a 1024-FFT in a high-speed DFT apparatus according to an embodiment.
Figure 7:
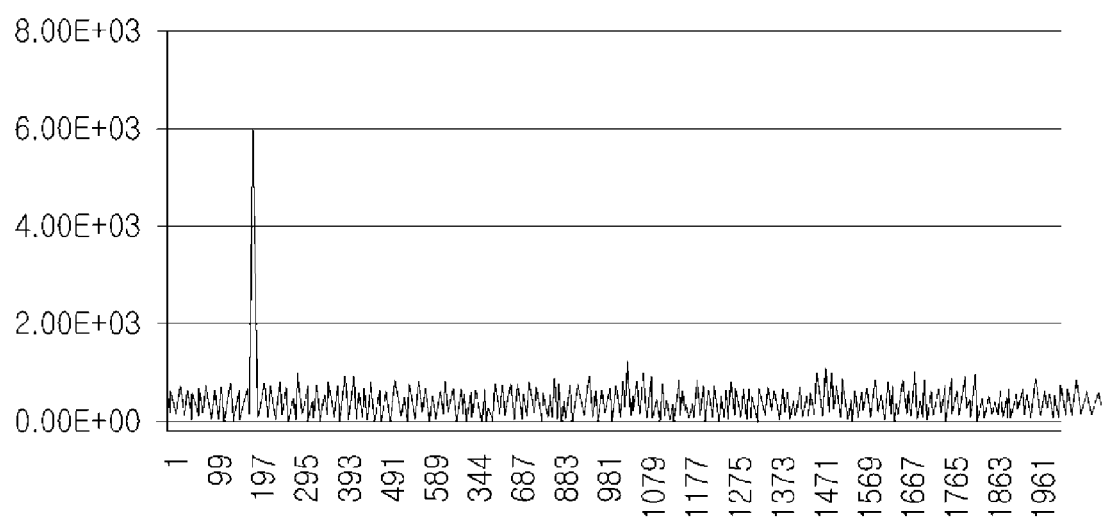
FIG. 7 is a graph illustrating a result of performing a 2048-FFT in a high-speed DFT apparatus according to an embodiment.

As shown in FFT output graphs in FIGS. 6 and 7, locations CS, 2*CS . . . of the highest values, which are present as an output of DFT, are present in an upper bound form of N/M times for the output of the FFT, and therefore, the preamble index is detected based thereon.

FIG. 6 is a graph illustrating a result of a 1024-FFT in a high-speed DFT apparatus according to an embodiment, which shows output values obtained by processing an input signal used in FIG. 1 in the high-speed DFT apparatus according to an embodiment.

More specifically, FIG. 6 shows output values obtained by performing a FFT after changing a first input signal of length 839 (M) into a second input signal of length 1024 (N) when a preamble index is 1. An index representing the highest value after the FFT according to an embodiment is 94 because the index is represented as an upper bound form of N/M times compared to the highest value after the DFT.

FIG. 7 is a graph illustrating a result of a 2048-FFT in a high-speed DFT apparatus according to an embodiment, which shows output values obtained by processing an input signal used in FIG. 1 in the high-speed DFT apparatus according to an embodiment.

That is, FIG. 7 shows an output of 2048-FFT when the preamble index is 1. An index representing the highest value is 188.

As described above, the apparatus according to this embodiment performs a FFT by changing a first input signal having a prime length into a second input signal having a length of an exponentiation of 2. However, the length of the second input signal is not limited to one exponentiation of 2 generated after the prime length of the first input signal, but may be changed into various exponentiations of 2 after the prime length of the first input signal.

Hereinafter, a high-speed DFT method executed in a high-speed DFT apparatus according to an embodiment will be described. The repeated descriptions thereof will be omitted or simplified.

Figure 8:
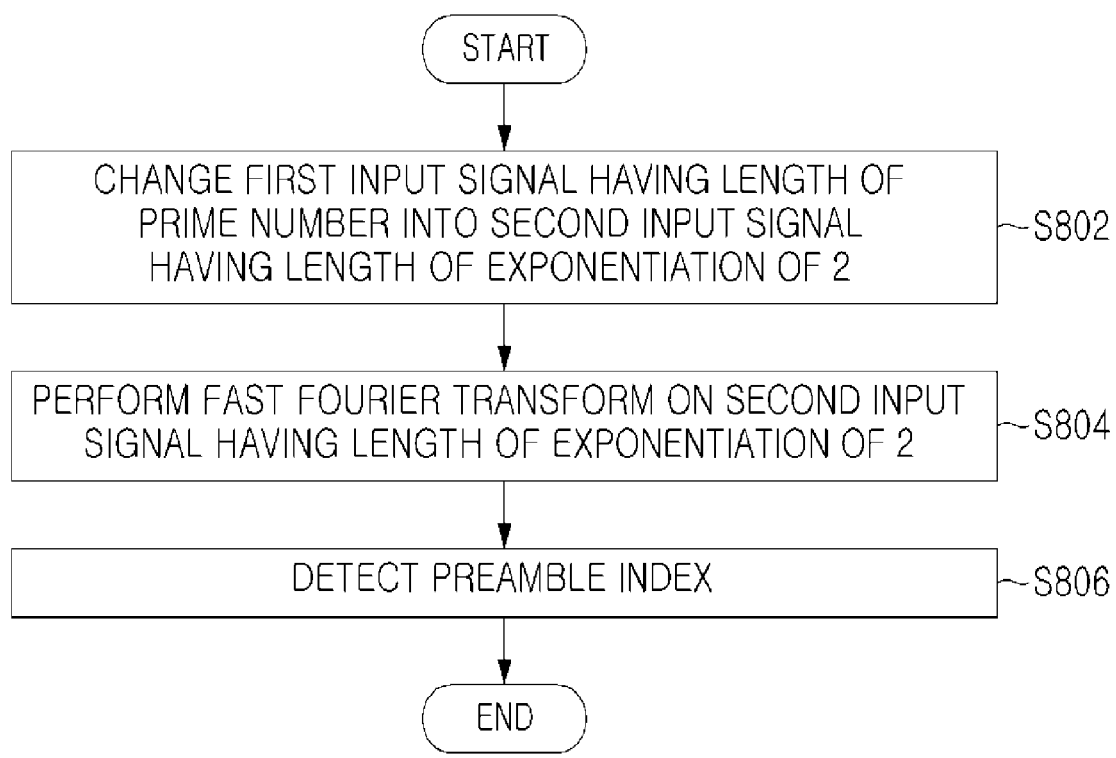
FIG. 8 is a flowchart illustrating a high-speed DFT method according to an embodiment.

FIG. 8 is a flowchart illustrating a high-speed DFT method according to an embodiment, illustrating a method of executing a DFT in the high-speed DFT apparatus in FIG. 4.

When a first input signal having a prime length to detect a random access signal is inputted into a terminal or a base station in a mobile communication system, the zero padding unit 21 adds zeros to the end of the first input signal to change the first input signal having a prime length into a second input signal having a length of an exponentiation of 2 (N=2$^n$), in step S802.

As described above, the zero padding unit sets index values assigned from M to N for the first input signal having a length N of a number corresponding to an exponentiation of 2 generated after a prime number M to 0.

Next, the N-FFT unit 22 performs a FFT on the second input signal of length N outputted from the zero padding unit to output a FFT-ed signal of length N in step S804. The output signal of the N-FFT is described in FIGS. 5 to 7.

Then, the preamble index decision unit 23 detects a preamble index from the signal outputted from the N-FFT in step S806. Thereafter, the terminal and the base station detect a random access signal using the preamble index.

A number of exemplary embodiments have been described above. Nevertheless, it will be understood that various modifications may be made. For example, suitable results may be achieved if the described techniques are performed in a different order and/or if components in a described system, architecture, apparatus, or circuit are combined in a different scheme and/or replaced or supplemented by other components or their equivalents. Accordingly, other implementations are within the scope of the following claims.

What is claimed is:

1. A high-speed Discrete Fourier Transform (DFT) apparatus comprising a terminal or a base station configured to execute:
   a zero padding unit receiving a first input signal having a certain length and changing the first input signal into a second input signal having a length of an exponentiation of 2;
   a Fast Fourier Transform (FFT) unit performing a FFT on the second input signal outputted from the zero padding unit; and
   a preamble index decision unit detecting a preamble index from an output signal outputted from the FFT unit,
   wherein the zero padding unit changes the first input signal having a length of a prime number into a second input signal having a length of an exponentiation of 2, which is larger than the prime number.

2. The high-speed DFT apparatus of claim 1, wherein the zero padding unit pads all parts after the first input signal with zeros to create the second input signal.

3. The high-speed DFT apparatus of claim 1, wherein the preamble index decision unit determines the preamble index on the ground that the highest value of the output signal is N/M times as large as a maximum value of a signal obtained by a DFT on the first input signal,
   where N is a length of the first input signal, and M is a length of the second input signal.

4. A high-speed DFT method comprising:
   transforming, by a terminal or a base station, a first input signal having a length of a prime number into a second input signal having a length of an exponentiation of 2;
   performing a FFT on the second input signal; and
   detecting a preamble index from an output signal of the FFT,
   wherein the transforming of a first input signal comprises:
   selecting one of the exponentiations of 2 larger than the prime number; and
   creating the second input signal having a length of the exponentiation of 2 by padding the end of the first input signal with zeros.

5. The high-speed DFT method of claim 4, wherein the detecting of a preamble index comprises:
   finding a maximum index of the output signal using a length ratio of the first input signal to the second input signal; and
   detecting the preamble index from the maximum index.

6. The high-speed DFT method of claim 4, wherein the detecting of a preamble index comprises:
   verifying a first maximum index when a preamble index of a signal, which is outputted from a DFT on the first input signal, is 1;
   obtaining a shift factor by dividing the length of the second input signal by the length of the first input signal;
   obtaining a second maximum index on the output signal by multiplying the verified first maximum index by the shift factor;
   detecting a maximum value position on the output signal; and
   detecting a preamble index by subtracting the second maximum index at the detected position.

* * * * *